(12) United States Patent
Shin

(10) Patent No.: US 6,390,497 B1
(45) Date of Patent: May 21, 2002

(54) AIRBAG DOOR OF A VEHICLE

(75) Inventor: Dal Soo Shin, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/752,104

(22) Filed: Dec. 29, 2000

(30) Foreign Application Priority Data

Sep. 1, 2000 (KR) ........................................ 2000-51636

(51) Int. Cl.$^7$ .............................................. B60R 21/16
(52) U.S. Cl. .................................... 280/728.3; 280/732
(58) Field of Search ........................... 280/728.3, 728.1, 280/732, 731

(56) References Cited

U.S. PATENT DOCUMENTS 5,901,976 A * 5/1999 Kreuzer et al. ............. 280/732
6,158,763 A * 12/2000 Dominique et al. ..... 280/728.3

* cited by examiner

Primary Examiner—Eric Culbreth
(74) Attorney, Agent, or Firm—Christie, Parker & Hale, LLP

(57) ABSTRACT

This invention relates to an airbag door of a vehicle characterized by having a plate spring 12 located underneath the internal surface of said airbag door 10 which has a restoring force to be rolled up and multiple evenly spaced grooves 14 generated in the lower part of said airbag door 10 so that said airbag door 10 can be rolled up along the groove when said airbag door 10 is deployed thus enabling to prevent the windshield from breakage resulted from a physical contact with an airbag door 10 when said airbag door is deployed upon a vehicle collision.

6 Claims, 3 Drawing Sheets

AIRBAG DOOR OF A VEHICLE

CROSS-REFERENCE TO RELATED APPLICATION

This application claims priority of Korea patent Application No. 2000-51636, filed on Sep. 1, 2000.

BACKGROUND OF THE INVENTION

1. Field of the Invention

This invention relates to an airbag door of a vehicle which is designed to prevent the breakage of the windshield usually resulted from a direct contact with an airbag door when said airbag door is deployed upon a vehicle collision.

2. Description of the Prior Art

Many vehicles have been provided with airbags as a way to protect passengers as well as drivers from a possible automotive vehicle accident. The conventional airbags, however, have not been considered very advantageous in that the airbag doors 10 which encompass those airbags often damage the windshield 18 of a vehicle when said airbag doors are torn away as the airbags are deployed as for example shown in FIG. 4. One way to prevent the breakage of the windshield 18 is to mount a regulating device 16 to control the angle of airbag deployment on both sides of the airbag door 10 so that angle of deployment can be kept within a certain degree as shown in FIG. 5. Moreover, the central part of an airbag door 10 is cut open so that said airbag door 10 can avoid contacting the windshield 18 thus preventing the breakage of said windshield 18 as shown in FIG. 6. However, the mounting of said regulating device that can control the deployment angle of airbag door in FIG. 5 is very difficult and also those devices are usually unable to tolerate the pressure delivered by the deploying airbag. Moreover, the fact that the conventional airbags in FIG. 6 are deployed as the airbag doors are torn open in the center undermines the directional control of the airbag deployment in that the airbag deployment may not be directed toward a passenger when there is a vehicle collision.

SUMMARY OF THE INVENTION

Therefore, the object of this invention is to provide an airbag door of a vehicle characterized by having a dual safety mechanism comprising 1) a plate spring beneath the internal surface of said airbag door with a restoring force to be rolled up and also 2) multiple evenly spaced grooves formed in the lower part of said airbag door so that said airbag door can be rolled up along the grooves when said airbag door is deployed, thus preventing windshield breakage resulting from a direct contact with an airbag door when said airbag door is deployed due to a vehicle collision.

CODE EXPLANATION OF THE MAJOR PARTS

Figure 1:
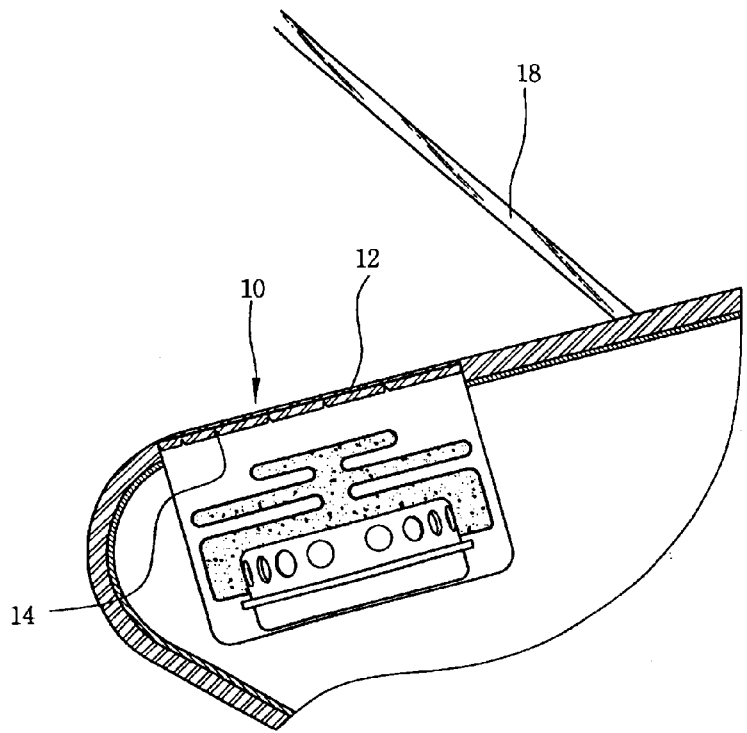
FIG. 1 shows an airbag door of a vehicle installed according to this invention.
Figure 2:
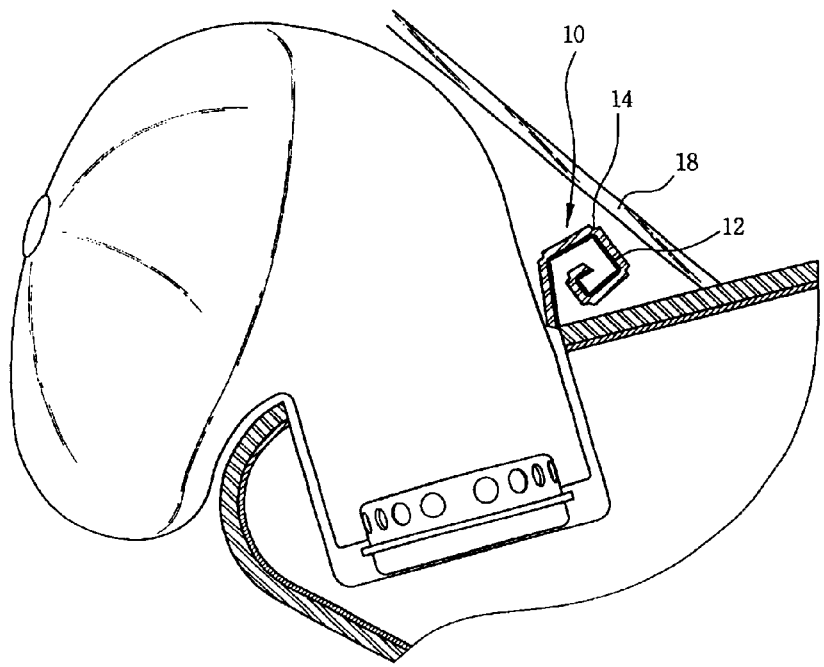
FIG. 2 shows a cross-sectional view of a deployed airbag door of a vehicle installed according to this invention.

10: airbag door
12: plate spring
14: a groove
16: a regulating device of deployment angle
18: windshield

DESCRIPTION OF THE PREFERRED EMBODIMENTS

The main object of this invention is to provide an airbag door of a vehicle characterized by having a plate spring 12 inside an airbag door 10 manufactured entirely by means of injection molding. The airbag door has many evenly spaced grooves 14 in its lower part.

The overall scheme of this invention can be delineated in a more clear fashion with reference to the FIGS as set forth hereunder.

Figure 3:
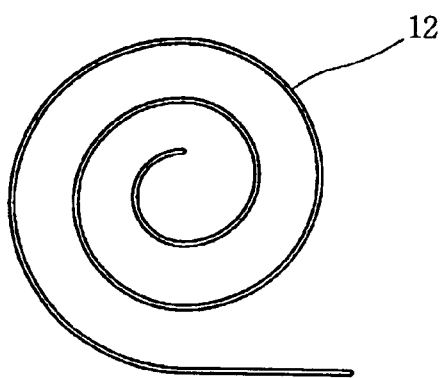
FIG. 3 shows a side view of a plate spring mounted inside an airbag door of a vehicle installed according to this invention.
Figure 4:
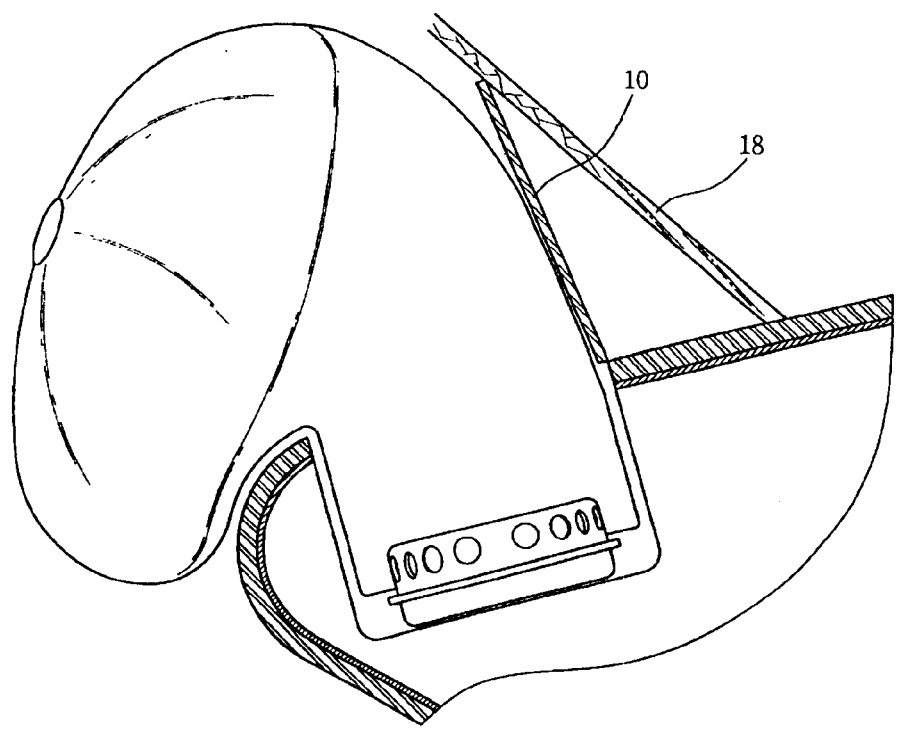
FIGS. 4, 5 and 6 show a deployed conventional airbag door of a vehicle.
Figure 5:
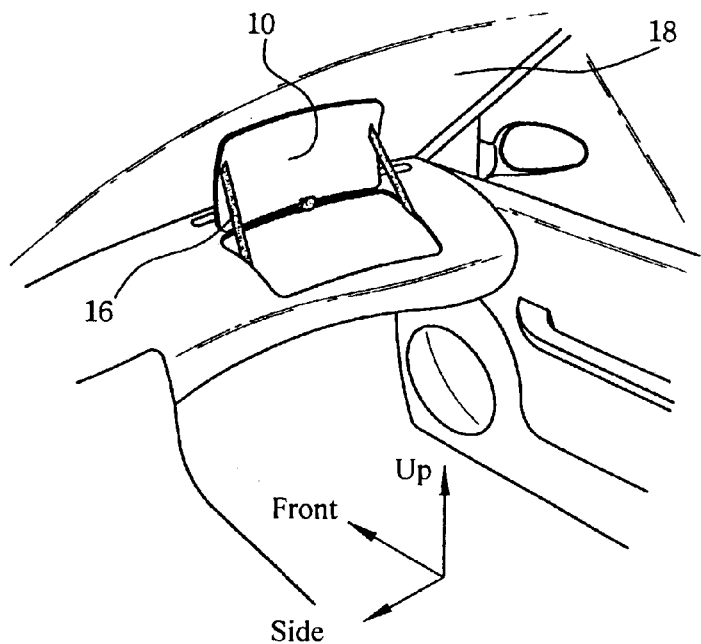
Figure 6:
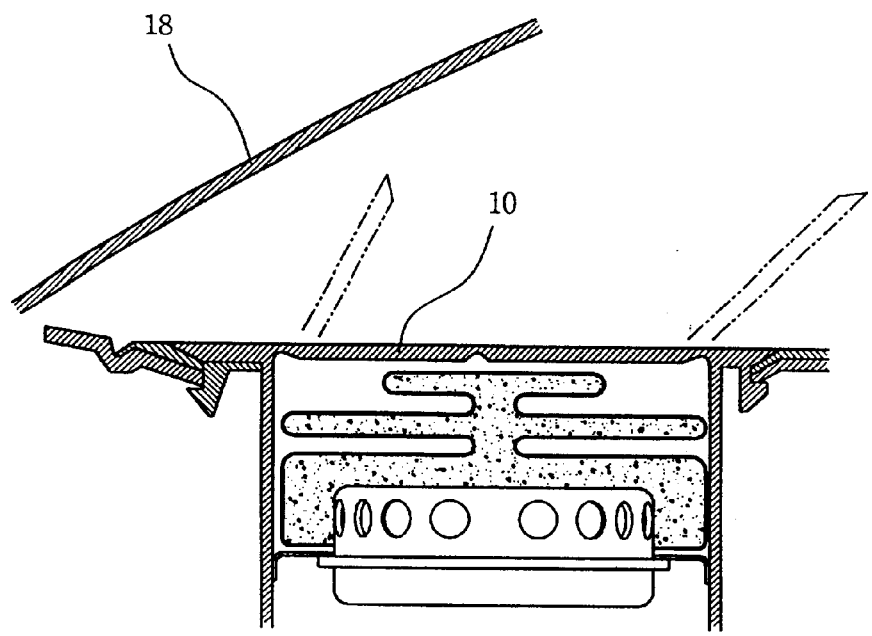

FIG. 1 shows a cross-sectional view of an airbag door of a vehicle. The airbag door 10 is designed to be opened up as an airbag is deployed upon a vehicle collision. Underneath said airbag door 10 which is manufactured by injection molding, there is provided a plate spring 12 as shown in FIG. 3. Said plate spring 12 is the one that has a restoring force to be rolled up, and it is installed so that the direction that it is being rolled and the direction that said airbag door 10 is deployed can be unidirectional. In addition, there are provided many grooves 14 in the lower part of the airbag door 10 which are evenly spaced and also parallel to the east-west direction of a given vehicle frame. Since the airbag door 10 is torn open triggered by a vehicle collision, the airbag door 10 is rolled up being forced by the restoring force of the plate spring 12, and the airbag door 10 is being rolled up via a multiple sequential bending action with its bending activity centered on the grooves 14 formed in the lower part of said airbag door 10. Because the airbag door 10 is being rolled p to be deployed, the airbag door 10 can avoid contacting the windshield 18 and is thus able to prevent said windshield from the breakage which used to occur in vehicles equipped with the conventional airbag doors. Further, said airbag door 10 having only grooves 14 can ben also bent in the multiple and sequential fashion even without a plate spring 12.

Consequently, this invention presents a novel airbag door of a vehicle which can prevent the usual breakage of a windshield resulting from a vehicle collision by providing a dual safety system which has a plate spring having a restoring force which rolls the spring up. The plate spring is mounted beneath the airbag door thus airbag door can be rolled up instead of being burst open. The airbag door has many evenly spaced grooves formed in its lower part allowing the airbag door to an orderly and sustained deployment sufficient to avoid sudden contact with the windshield of a vehicle when there is a vehicle accident.

What is claimed is:

1. An airbag door for a vehicle comprising:
   a wall having a first surface opposite a second surface; and
   an elastic member, said elastic member having a first unrolled state and a second rolled state, wherein when not restrained said elastic member is in the second state, wherein said elastic member is coupled to the first surface when in the first state, and wherein said elastic member can cause said wall to roll.

2. An airbag as recited in claim 1 further comprising a plurality of grooves formed on the second surface for facilitating rolling of said wall, wherein said grooves are generally parallel to each other and to an axis about which said wall rolls.

3. An airbag as recited in claim 1 wherein said elastic member is a plate spring.

4. An airbag door for a vehicle comprising:

a wall coupled to the vehicle and moveable from a first position to a second position, wherein when in the second position the wall is rolled, wherein the wall is in the first position when a vehicle airbag is not deployed, wherein the wall is in a second position when the vehicle airbag is deployed, the wall having a first surface opposite a second surface;

an elastic member coupled to the wall first surface, said elastic member having a rolled state when not restrained and an unrolled state, wherein when the wall is in the second position the elastic member causes the wall to roll.

5. An airbag as recited in claim 4 further comprising a plurality of grooves formed on the second surface for facilitating rolling of said wall, wherein said grooves are generally parallel to each other and to an axis about which said wall rolls.

6. An airbag as recited in claim 4 wherein said elastic member is a plate spring.

* * * * *